(12) United States Patent
Giddens et al.

(10) Patent No.: US 7,143,719 B1
(45) Date of Patent: Dec. 5, 2006

(54) PET TREAT DISPENSER ASSEMBLY WITH CLICKER

(76) Inventors: Susan L. Giddens, 18090 SE. 145th Rd., Gower, MO (US) 64454; Charles Jason Brown, 8877 NW. 268th St., Gower, MO (US) 64454

(*) Notice: Subject to any disclaimer, the term of this patent is extended or adjusted under 35 U.S.C. 154(b) by 0 days.

(21) Appl. No.: 11/175,413

(22) Filed: Jul. 6, 2005

(51) Int. Cl.
*A01K 5/00* (2006.01)
*A01K 15/02* (2006.01)

(52) U.S. Cl. .................................. 119/51.01
(58) Field of Classification Search ............ 119/51.01, 119/52.1, 51.02, 52.4, 51.11, 51.12, 54, 702, 119/707, 710; 221/151, 152, 268, 271, 197, 221/3
See application file for complete search history.

(56) References Cited

U.S. PATENT DOCUMENTS

| | | | |
|---|---|---|---|
| 2,256,340 A * | 9/1941 | Gora et al. | 446/298 |
| 2,518,986 A * | 8/1950 | Griffith | 222/181.1 |
| 3,132,864 A * | 5/1964 | Glass et al. | 273/127 R |
| 3,660,930 A * | 5/1972 | Indjian | 446/297 |
| 4,322,909 A * | 4/1982 | Holahan et al. | 446/479 |
| 4,381,845 A * | 5/1983 | Feis | 221/185 |
| 4,500,145 A * | 2/1985 | Fassauer | 312/61 |
| 4,502,612 A * | 3/1985 | Morrison | 221/185 |
| 4,722,300 A * | 2/1988 | Walker et al. | 119/51.11 |
| 4,887,737 A * | 12/1989 | Adenau | 221/3 |
| 4,889,077 A * | 12/1989 | Possis | 119/51.11 |
| 4,947,796 A * | 8/1990 | Robinette | 119/51.5 |
| 4,978,030 A * | 12/1990 | Morris et al. | 221/3 |
| 5,016,572 A * | 5/1991 | Weber et al. | 119/52.1 |
| 5,062,388 A * | 11/1991 | Kilham | 119/52.2 |
| 5,078,097 A * | 1/1992 | Chisholm | 119/51.13 |
| 5,152,590 A * | 10/1992 | Dukes | 312/71 |
| 5,230,300 A * | 7/1993 | Mezhinsky | 119/51.11 |
| 5,310,082 A * | 5/1994 | Coustenoble | 221/2 |
| 5,349,925 A * | 9/1994 | Zerato et al. | 119/62 |
| 5,356,035 A * | 10/1994 | Shlopak et al. | 222/78 |
| 5,365,879 A * | 11/1994 | Ying-Kuan | 119/54 |
| 5,366,113 A * | 11/1994 | Kim et al. | 221/232 |
| 5,388,723 A * | 2/1995 | Kampmeyer | 221/186 |
| 5,517,944 A * | 5/1996 | Bate et al. | 119/53 |
| 5,520,296 A * | 5/1996 | Freed | 215/206 |
| 5,520,307 A * | 5/1996 | Miller et al. | 221/2 |
| 5,529,221 A * | 6/1996 | Roy | 222/181.2 |
| 5,702,013 A * | 12/1997 | Freed | 215/206 |
| 5,735,231 A * | 4/1998 | Terenzi | 119/51.11 |
| 5,779,095 A * | 7/1998 | Diamond | 221/263 |
| 5,791,286 A * | 8/1998 | Taussig et al. | 119/52.3 |
| 6,041,737 A * | 3/2000 | Hennigan | 119/165 |
| 6,062,438 A * | 5/2000 | Ellis et al. | 222/349 |
| 6,142,099 A * | 11/2000 | Lange, Jr. | 119/51.5 |
| 6,142,337 A * | 11/2000 | Schreckenberg et al. | 221/263 |
| 6,200,189 B1 * | 3/2001 | Coleman et al. | 446/298 |
| 6,205,950 B1 * | 3/2001 | Thompson, Jr. | 119/51.5 |
| 6,220,479 B1 * | 4/2001 | Fishman | 221/24 |

(Continued)

*Primary Examiner*—Yvonne R. Abbott
(74) *Attorney, Agent, or Firm*—McKee, Voorhees & Sease, P.L.C.

(57) ABSTRACT

An improved pet treat dispenser assembly is provided with a canister for holding pet treats, a dispenser slidably mounted in the canister for dispensing treats, and a clicker on the canister to attract a pet's attention following desired behavior. The canister includes an upper housing, a lower base, and an internal treat tray. The housing can be removed from the base and tray for filling with treats, and can be used as a scoop so as to load the housing with treats.

16 Claims, 7 Drawing Sheets

U.S. PATENT DOCUMENTS

| | | | |
|---|---|---|---|
| 6,267,639 B1 * | 7/2001 | Menow et al. | 446/81 |
| 6,293,434 B1 * | 9/2001 | Ellis et al. | 222/135 |
| 6,315,163 B1 * | 11/2001 | Shu | 222/39 |
| 6,367,417 B1 * | 4/2002 | Gal et al. | 119/51.5 |
| 6,390,328 B1 * | 5/2002 | Obermeier et al. | 221/203 |
| 6,401,970 B1 * | 6/2002 | Harris et al. | 221/24 |
| 6,435,381 B1 * | 8/2002 | Waldman | 222/505 |
| 6,487,987 B1 * | 12/2002 | Choi | 119/51.5 |
| 6,651,592 B1 * | 11/2003 | Maddox et al. | 119/720 |
| 6,681,954 B1 * | 1/2004 | Coleman et al. | 221/254 |
| 6,694,916 B1 * | 2/2004 | Rucker et al. | 119/51.01 |
| 6,702,149 B1 | 3/2004 | Brown et al. | |
| 6,860,403 B1 * | 3/2005 | Mehrens et al. | 221/265 |
| 6,863,025 B1 * | 3/2005 | Ness | 119/72 |
| D504,545 S * | 4/2005 | Morosin et al. | D30/122 |
| 7,017,780 B1 * | 3/2006 | Renaud | 221/263 |
| 2004/0134434 A1 * | 7/2004 | Kraft et al. | 119/51.01 |
| 2005/0084322 A1 * | 4/2005 | Apar et al. | 401/175 |
| 2005/0183674 A1 * | 8/2005 | Zutis et al. | 119/719 |
| 2005/0263082 A1 * | 12/2005 | Rutledge | 119/51.01 |
| 2006/0000416 A1 * | 1/2006 | Zutis et al. | 119/51.01 |
| 2006/0113315 A1 * | 6/2006 | Chen | 221/268 |

* cited by examiner

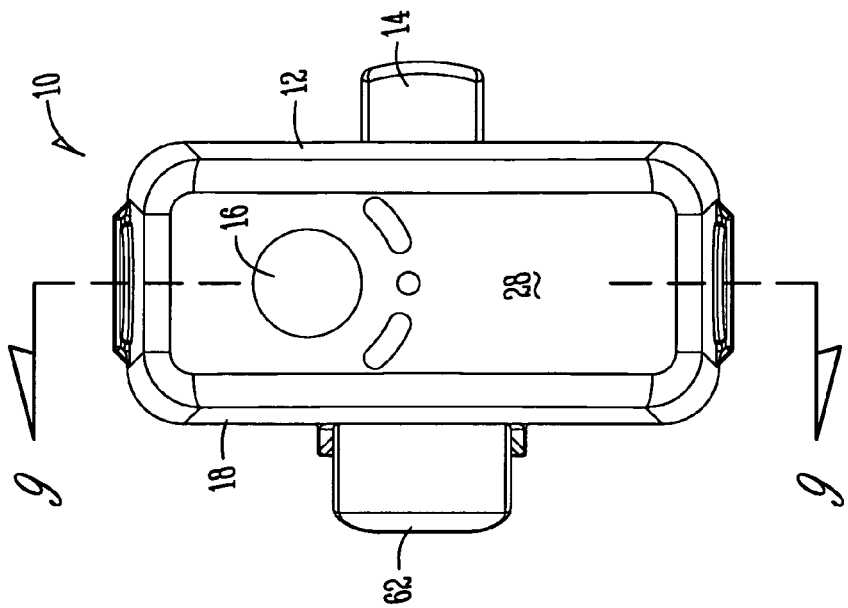
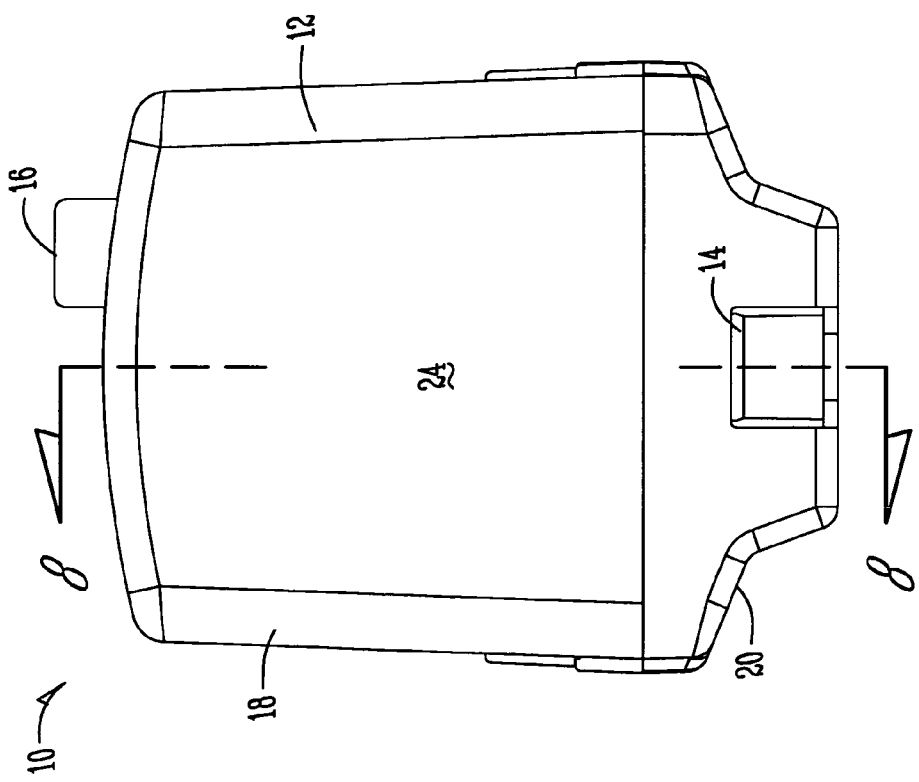

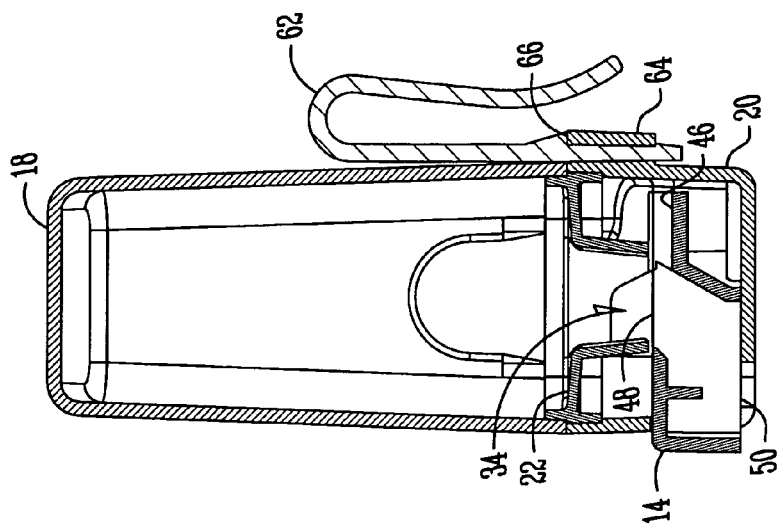
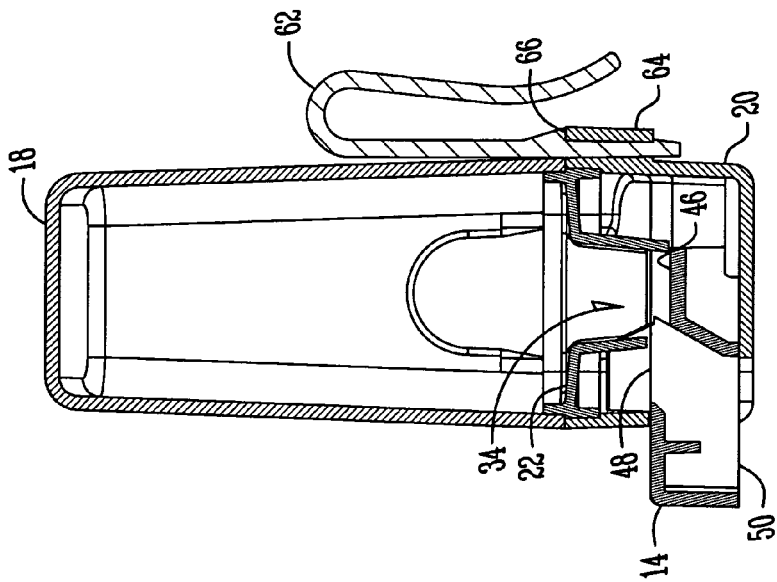
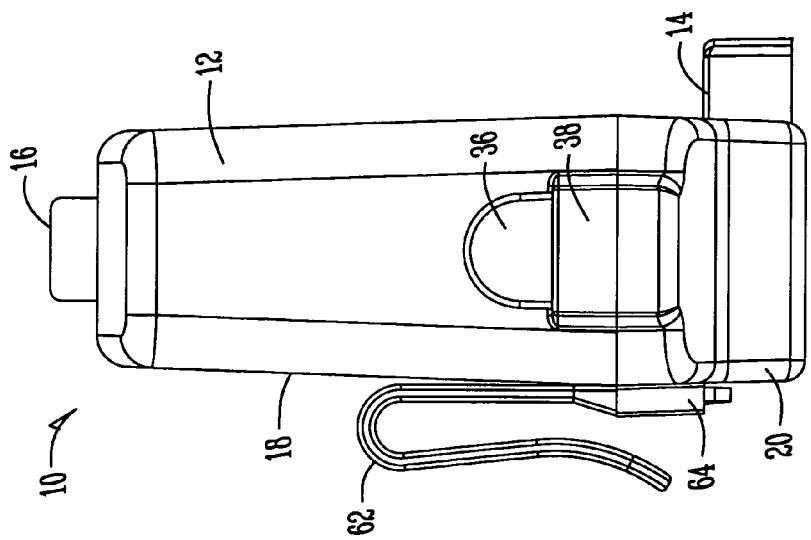

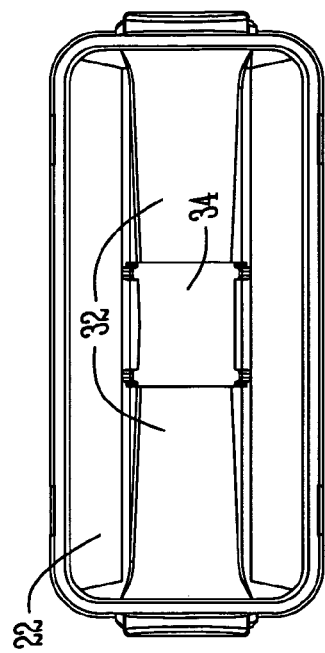
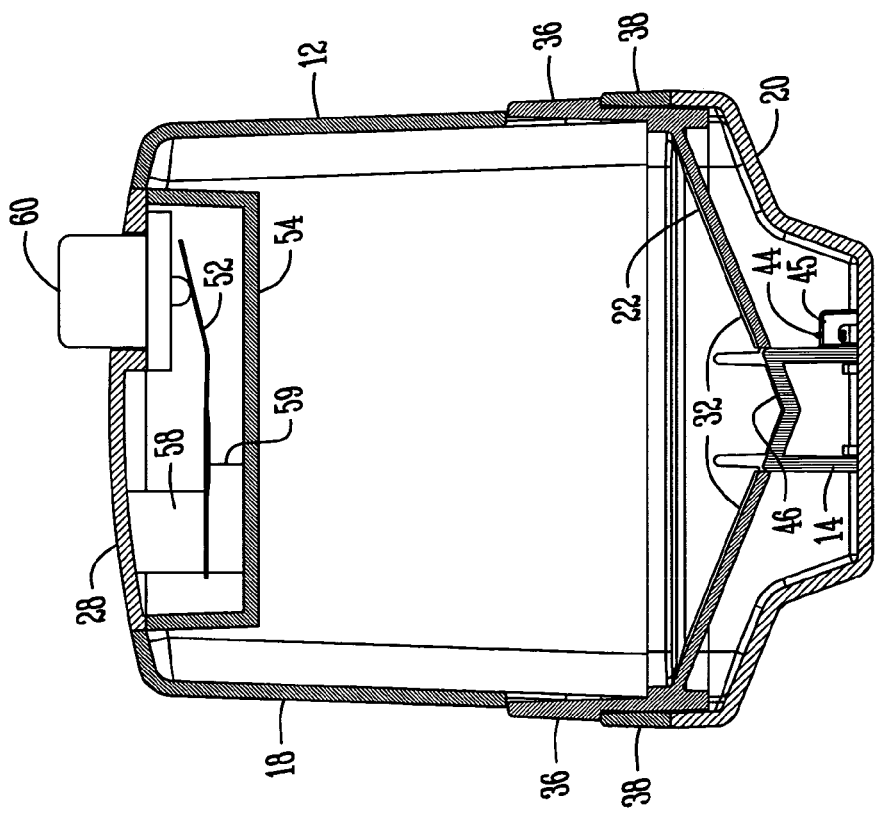

PET TREAT DISPENSER ASSEMBLY WITH CLICKER

BACKGROUND OF THE INVENTION

Treat dispensers are often used in pet training. More particularly, when the pet performs a desired act, a treat is awarded as positive reinforcement so as to reinforce such behaviors. Both pet owners and trainers use treat dispensers, which are available in various forms. As described in Applicant's prior treat dispenser, U.S. Pat. No. 6,702,149, the prior art treat dispensers have various drawbacks, and accordingly are less than ideal for maximum positive reinforcement of the pet.

Accordingly, a primary objective of the present invention is the provision of an improved pet treat dispenser assembly.

Another objective of the present invention is the provision of a pet treat dispenser assembly having a clicker.

A further objective of the present invention is a provision of a pet treat dispenser assembly which can be quickly and easily loaded with pet treats.

Another objective of the present invention is the provision of a pet treat dispenser assembly which can be easily used by a person's left or right hand.

Still another objective of the present invention is the provision of a pet treat dispenser assembly which can be quickly and easily assembled and disassembled for loading and cleaning.

Yet another objective of the present invention is the provision of a pet treat dispenser assembly having an easy-to-actuate dispenser button.

Still another objective of the present invention is the provision of a pet treat dispenser assembly having an upper housing and a lower base, with the housing being removable from the base so as to be used as a scoop for loading the housing with pet treats.

Another objective of the present invention is the provision of a pet treat dispenser assembly which is economical to manufacture and durable in use.

These and other objectives will become apparent from the following description of the invention.

BRIEF SUMMARY OF THE INVENTION

The pet treat dispenser assembly of the present invention comprises a canister for holding pet treats, a dispenser on the canister for dispensing a treat from the canister, and a clicker on the canister to provide an audible noise to obtain the pet's attention. The canister includes an upper housing, a lower base, and an internal tray. The housing is removably mounted to the base, and has an open end for loading treats into the housing when the housing is removed from the base. The housing can also be used as a scoop for loading treats. The dispenser is slidably mounted in the base, and can be quickly and easily actuated by the left or right hand of a pet owner or trainer so as to discharge a treat from the canister, and thereby providing positive reinforcement for desired behavior of the pet.

BRIEF DESCRIPTION OF THE DRAWINGS

FIG. 5 is a rear elevation view of the dispenser assembly.

FIG. 6 is a top plan view of the assembly.

FIG. 7 is an end elevation view of the assembly.

FIG. 8A is a sectional view taken along lines 8—8 of FIG. 5 showing the dispenser in its normal extended position.

FIG. 8B is a view similar to FIG. 8A showing the dispenser in a retreated or depressed position.

FIG. 9 is a sectional view taken along lines 9—9 of FIG. 6.

FIG. 10 is a top plan view of the internal tray of the dispenser assembly.

DETAILED DESCRIPTION OF THE PREFERRED EMBODIMENT

Figure 1:
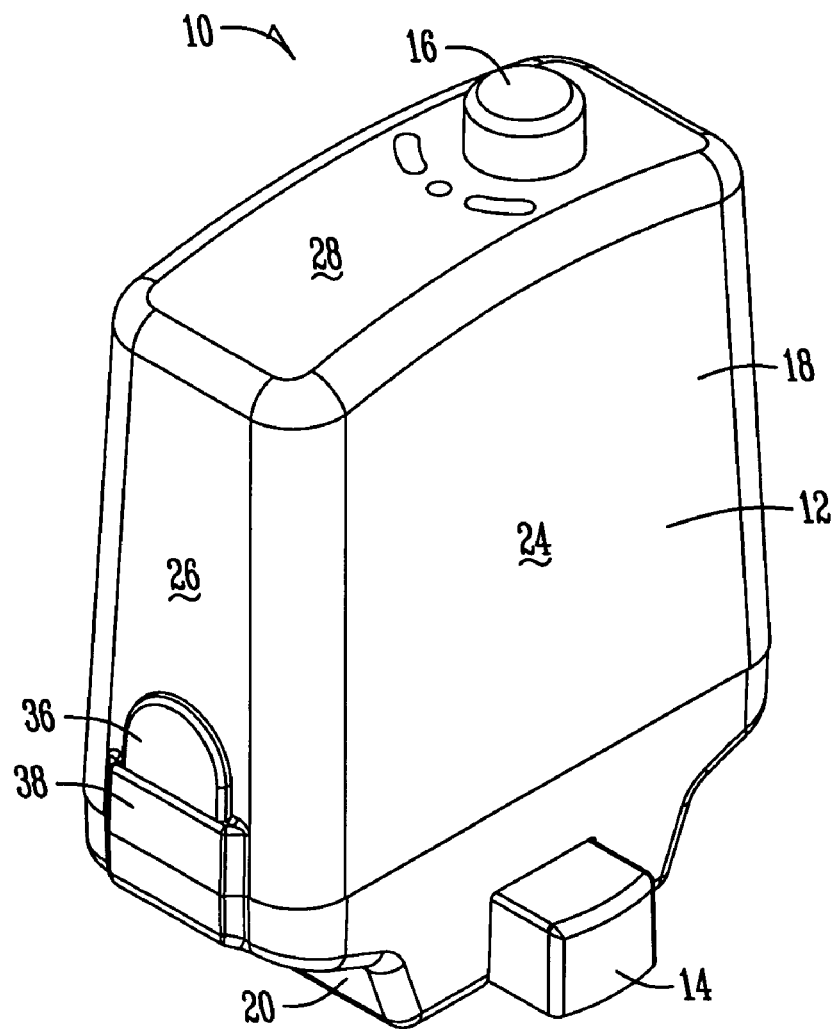
FIG. 1 is a front perspective view of the pet treat dispenser assembly of the present invention.

The pet treat dispenser assembly of the present invention is generally designated by the reference numeral 10 in the drawings. The assembly generally comprises a canister 12, a dispenser 14, and a clicker 16. The canister 12 includes an upper housing 18, a lower base 20, and an intermediate or internal tray 22.

The housing 18 includes opposite sides 24, opposite ends 26, and a top wall 28. The lower end 30 of the housing 18 is open so that treats can be loaded into the housing 18 when the housing is removed from the base 20. Alternatively, the housing 18 can be used as a scoop to fill the housing with treats when the housing 18 is removed from the base 20.

The base 20 and tray 22 are secured together by friction fit, adhesive, plastic welding, or any other convenient means. The tray 22 includes downwardly sloped walls 32 and an opening 34 at the lower ends of the walls 32. The tray 22 also includes a pair of resilient end tabs 36 which extend upwardly so as to extend through a pair of collars 38 on the housing 18. A shoulder 40 on each of the tabs 36 engages collars 30 so as to releasably mount the base 20 and tray 22 to the housing 18 so as to form the canister 12.

The base 20 includes a side opening 42 in which the dispenser 14 is slidably mounted for movement between a first extended position and a second depressed position. A spring 44 normally biases the dispenser 14 to the extended position. The spring 44 has a first end attached to a post 43 in the base 20 and a second end attached to a side extension 45 on the interior end of the dispenser 14 (FIG. 9).

The dispenser 14 is in the form of a button. The upper rear wall 46 of the dispenser 14 is aligned with the opening 34 in the tray 22 when the dispenser 14 is in the extended position, thereby preventing a treat from dropping through the opening 34. The dispenser 14 also has a hole 48 which aligns with the opening 34 in the tray 22 when the dispenser 14 is depressed, thereby allowing a treat to fall through the opening 34 and the hole 48 into the base 20. When the dispenser 14 is released so as to return to the extended position by the force of the spring 44, a lower opening 50 on the base 20 is exposed to allow the treat to drop out of the dispenser assembly 10 and into the hand of the person operating the assembly 10.

The clicker 16 may be any type of device that makes a noise to attract the pet's attention. As shown in FIG. 9, the clicker includes a metal plate 52 which is mounted in the upper portion of the housing 18. A cover 54 is provided for the plate 52, so that treats within the canister 12 do not interfere with operation of the clicker 16. The cover 54 is molded as part of the housing 18. The top wall 28 of the housing 18 is preferably a separate molded piece to allow assembly of the clicker plate 52, and is then adhered to the main body of the housing. The plate 52 is attached to the housing 18 in any convenient manner. For example, the plate 52 may be sandwiched between a boss 58 on the housing 18 and a boss 59 on the cover 54. An actuation button 60 is mounted in the housing 18 and extends upwardly through a hole in the top wall 28 of the housing 18. The clicker button 60 engages the clicker plate 52. The owner or trainer can push the clicker button 60 so as to deflect the plate 52, so as to make a clicking sound. Typically, a pet soon develops a Pavlov reaction to the sound of the clicker 16, thereby providing further positive reinforcement for desired behavior. While the clicker is normally actuated immediately following desired behavior by the pet and just before a treat is dispensed, it is understood that the clicker does not have to be used.

Figure 2:
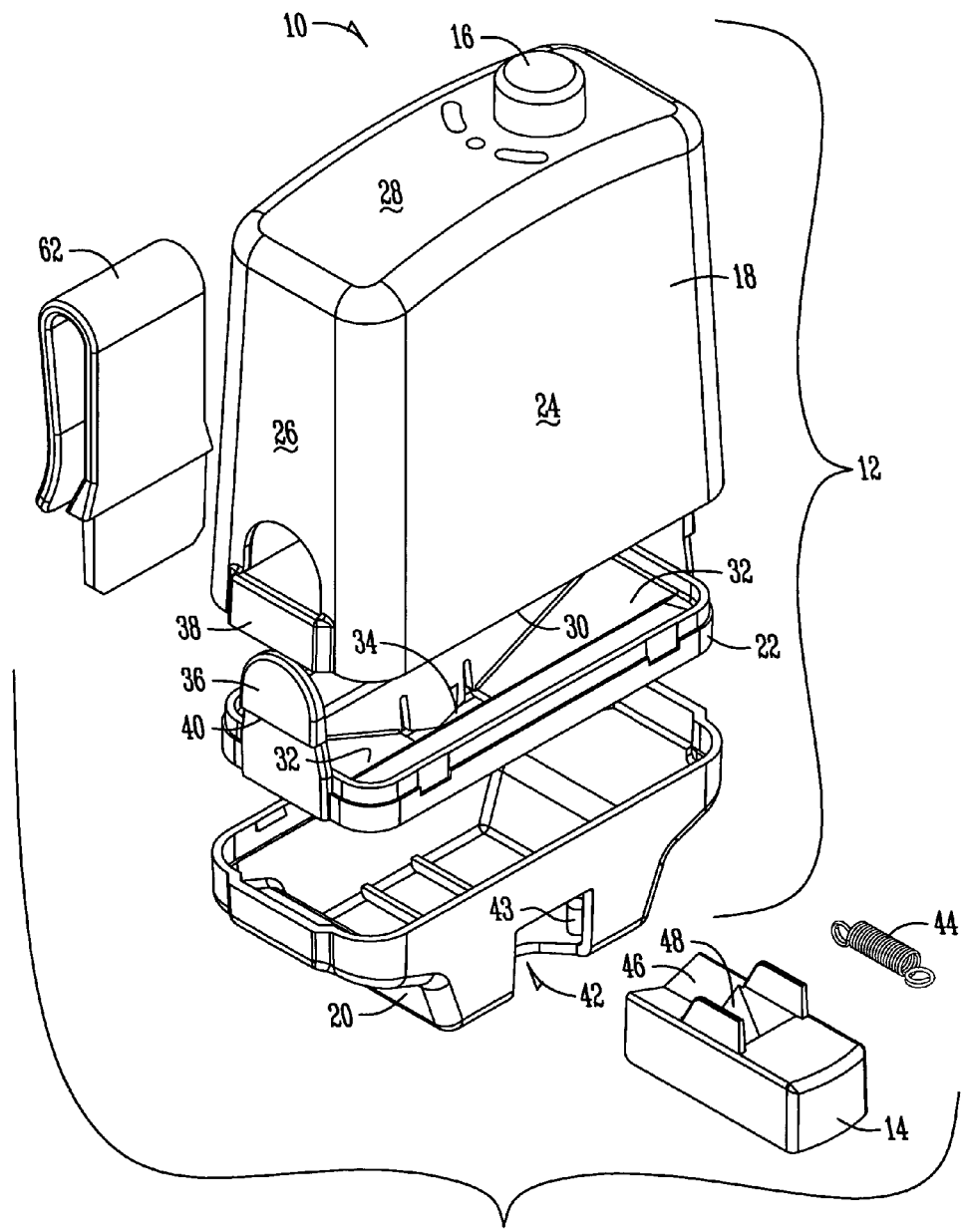
FIG. 2 is an exploded front perspective view of the assembly.
Figure 3:
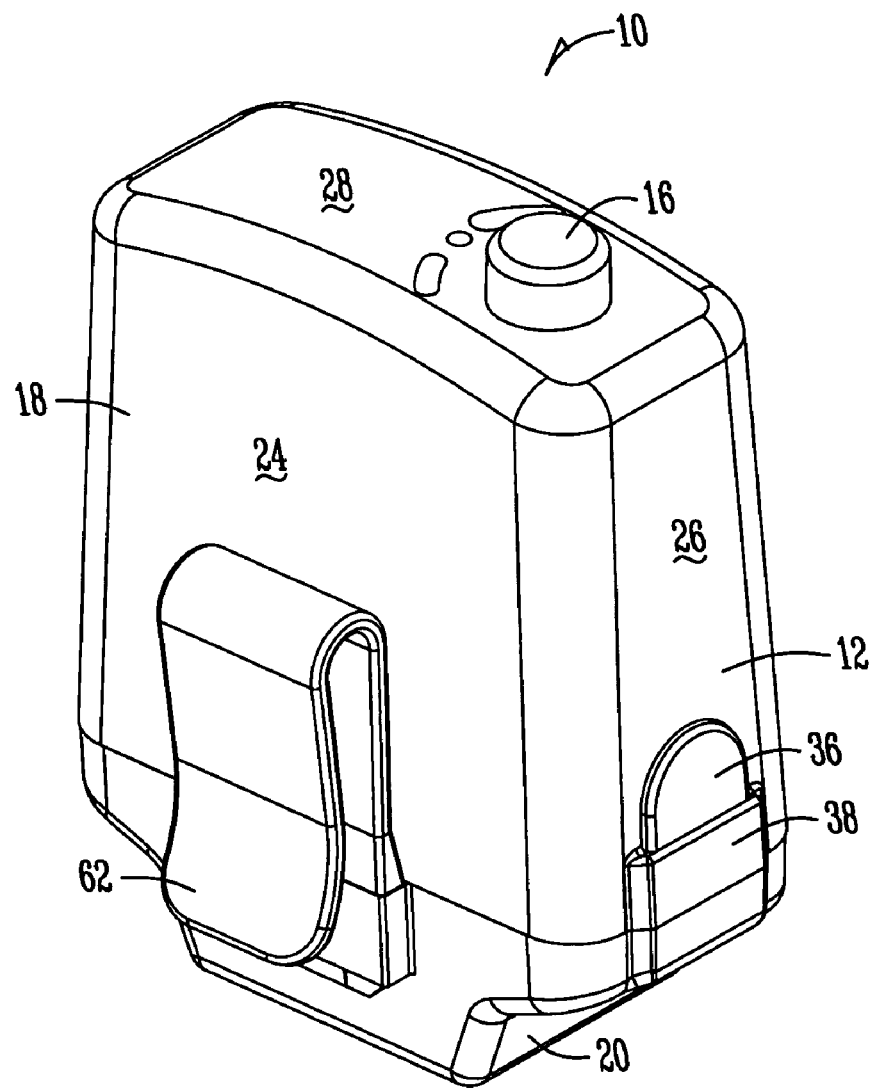
FIG. 3 is a rear perspective view of the treat dispenser assembly.
Figure 4:
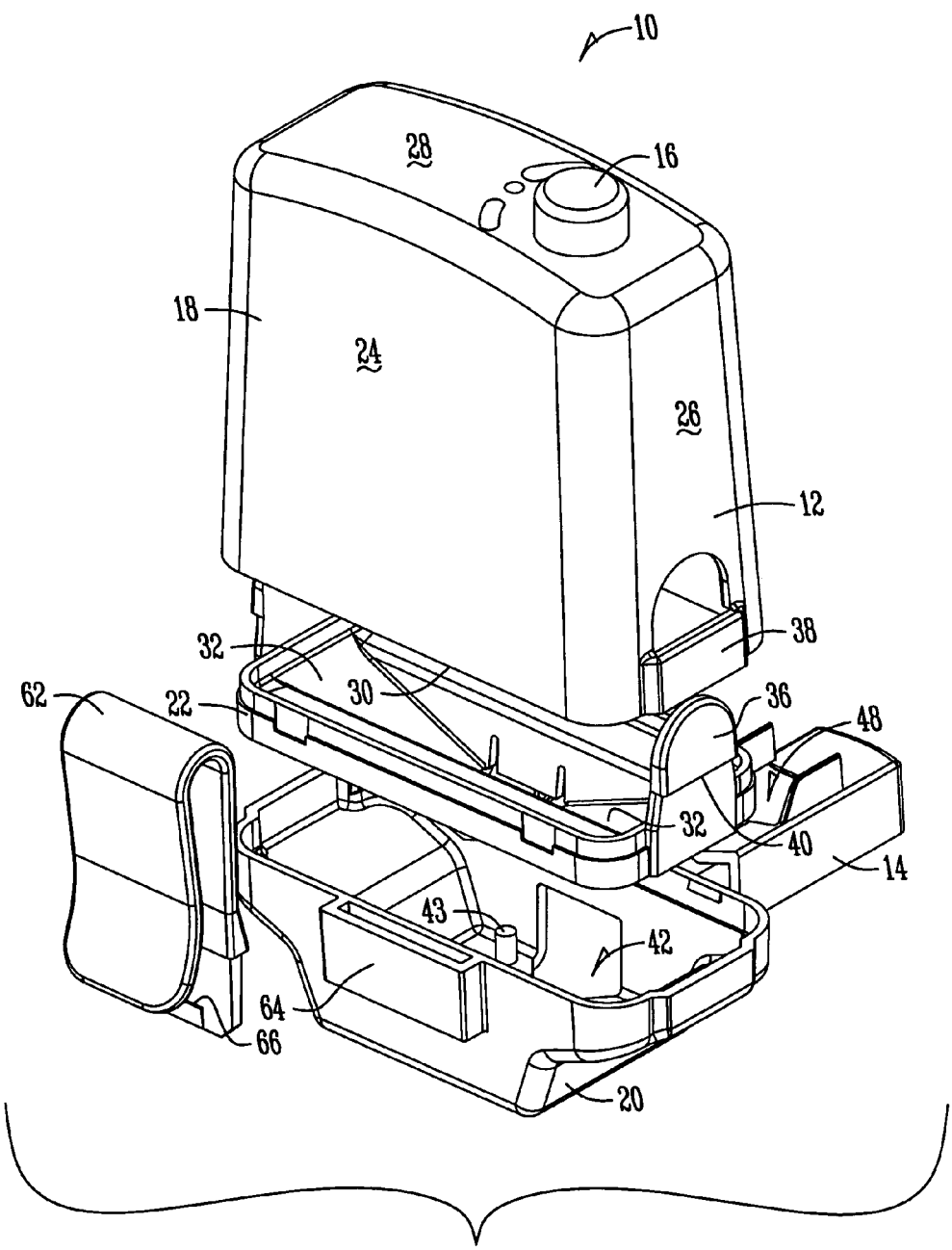
FIG. 4 is an exploded rear perspective view of the assembly.

The canister 12 is provided with a belt clip 62. The clip 62 may be attached to the canister by any convenient means. As seen in FIGS. 2 and 4, the clip 62 is a separate component having a lower end slidably received within a collar 64 on the base 20. A shoulder 66 on the clip 62 retains the clip 62 in position after being inserted through the collar 64.

In use, the treat dispenser assembly 10 can be mounted on an owner's or trainer's belt or pants via the clip 62 on either the left or right side, as preferred by the owner or trainer. Thus, the assembly 10 is ambidextrous or non-handed. When the pet behaves as desired, the clicker button 60 can be actuated to make a sound, if desired, and the dispenser button 14 can be actuated to discharge a treat from the canister 12 into the owner's or trainer's hand. The pet can then be rewarded with the treat so as to provide positive reinforcement for the desired behavior.

It is understood that the assembly 10 can be used to dispense objects other than pet treats. For example, treats or snacks for children can be placed in the assembly for dispensement. Also, non-edible objects can also be dispensed. Thus, "treats" can include edible products for pets and/or people, as well as small non-edible objects.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A pet treat dispenser assembly for use with pets, comprising:
    a canister for holding pet treats, wherein the canister includes an upper housing, a lower base, and an internal tray;
    a button that normally blocks treats from discharge from the canister, the button is slidably mounted in the canister for reciprocal movement on the canister between a first position for retaining pet treats in the canister and a second position for dropping a single treat at a time from the canister by receiving a treat when moved to the second position and discharging the treat when returned to the first position; and
    a clicker on the canister.

2. The assembly of claim 1 wherein the button is in the base.

3. The assembly of claim 1 wherein the button is biased to the first position.

4. The assembly of claim 1 wherein the button extends from the canister in the first position and is retracted into the canister in the second position.

5. The assembly of claim 1 wherein the button has an upper opening for receiving a treat and a lower opening for discharging a treat.

6. The assembly of claim 1 wherein the tray includes an opening for passing a treat to the button.

7. The assembly of claim 6 wherein the button normally blocks the tray opening to preclude discharge of a treat from the canister.

8. The assembly of claim 1 wherein actuation of the button discharges a treat from the canister.

9. The assembly of claim 1 wherein the button is normally empty.

10. A pet treat dispenser assembly, comprising:
    a lower base;
    an upper housing removably mounted on the base and having an open end into which treats are loaded when the housing is removed from the base;
    a dispenser mounted in the base for movement between a first position precluding discharge of a pet treat and a second position dropping a single treat at a time; and
    a clicker on the housing.

11. The assembly of claim 10 further comprising a tray mounted within the base and having an opening to feed treats to the dispenser.

12. The assembly of claim 10 wherein the dispenser is a button slidably mounted in the base for reciprocal movement between first and second positions.

13. The assembly of claim 12 wherein the dispenser is biased to the first position.

14. The assembly of claim 12 wherein the dispenser receives a treat when moved to the second position, and discharges the treat when returned to the first position.

15. The assembly of claim 10 wherein the dispenser has an upper opening for receiving a treat and a lower opening for discharging a treat.

16. A pet treat dispenser assembly for use with pets, comprising:
    a canister for holding pet treats, wherein the canister includes an upper housing, a lower base, and an internal tray;
    a button that is slidably mounted in the canister for reciprocal movement on the canister between a first position for retaining pet treats in the canister and a second position for dropping a single treat at a time from the canister wherein the button extends from the canister in the first position and is retracted into the canister in the second position; and
    a clicker on the canister.

\* \* \* \* \*